J. DAVIS.
Hold-Back.
No. { 2,551. 33,555. }
Patented Oct. 22, 1861.
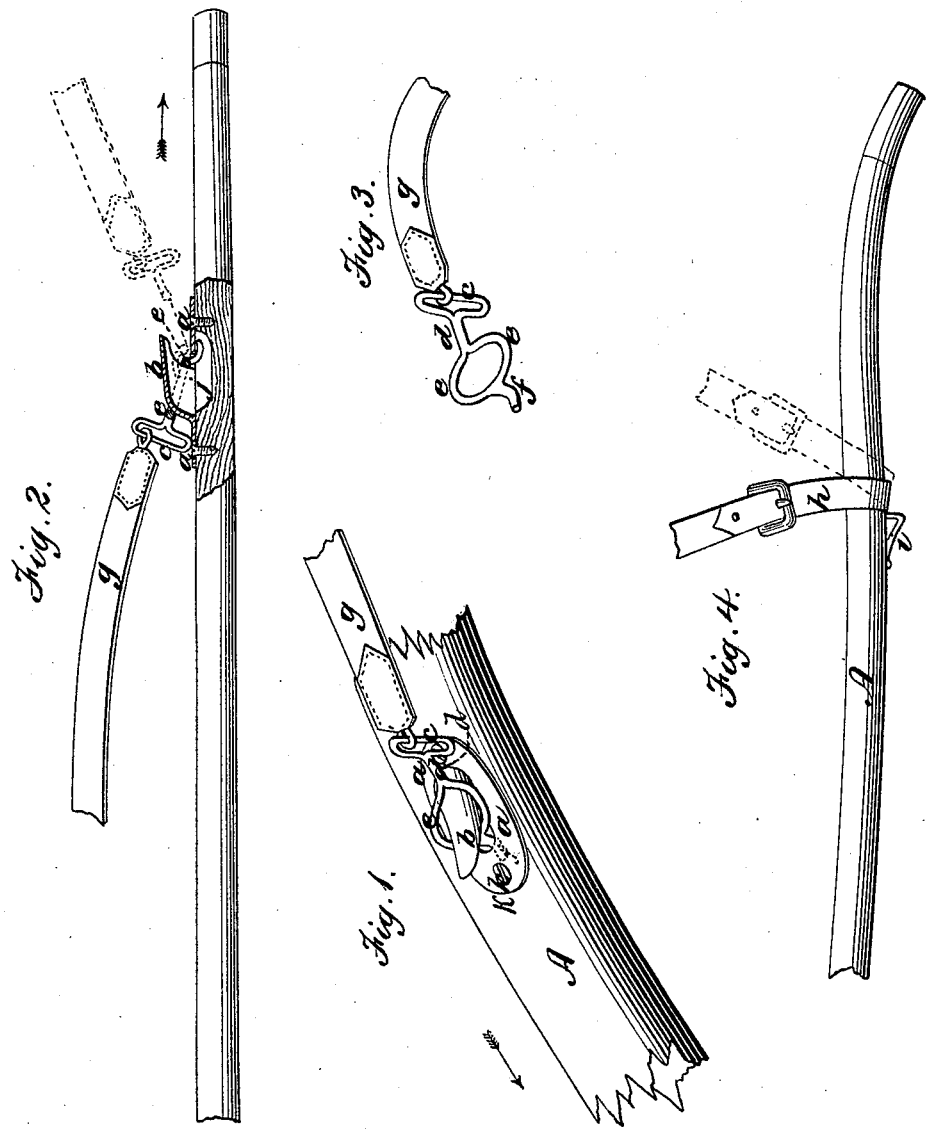

UNITED STATES PATENT OFFICE.

JOHN DAVIS, OF ELMIRA, NEW YORK, ASSIGNOR TO PATRICK H. FLOOD, OF SAME PLACE.

IMPROVEMENT IN HOLDBACKS FOR CARRIAGES AND OTHER VEHICLES.

Specification forming part of Letters Patent No. 33,555, dated October 22, 1861.

*To all whom it may concern:*

Be it known that I, JOHN DAVIS, of Elmira, in the county of Chemung and State of New York, have invented a new and Improved Holdback for Carriages and other Vehicles, of which the following is a specification.

My invention relates to that class of holdbacks for carriages and other vehicles which work automatically for the purpose of disengaging the horse from the thills and do not require for their proper adjustment and action the interposition or agency of springs of any kind. All those devices which heretofore have been constructed wherein a spring has been applied as a part of the holdback are subject to derangement, owing to the uncertain action of the spring employed and a liability of the spring to get out of order, thus detracting from their efficiency. Besides this, their construction is much more costly than my device.

The old mode of sustaining the thill in a horizontal position by a "shaft-tug" and making the shaft-tug bear against an elbow-iron secured to the under side of the thill to act as a holdback is also subject to serious objection, and for this reason: that after the traces are unhitched and the horse started forward the action of the said tug upon the thill is such as to cause a binding of the tug upon the thill, and this binding effect is enhanced by the fact that the movements of the horse are frequently such as to produce a torsion or twisting of the tug and so bind it all the tighter.

The object of my invention is to overcome these difficulties, and I have designed it particularly to be used in connection with my apparatus for detaching horses from carriages, for which a patent was granted to me November 6, 1860, although it may be used with great benefit upon the thills of carriages which have not my said patented improvement attached thereto; and now, having described the nature and object of my invention, I will, in order that others skilled in the art may be enabled to make and use it, proceed to describe its construction and operation, as required by statute; and I do hereby declare that the following is a full and exact description thereof, reference being had to the accompanying drawings, making a part of my specification, in which like letters indicate the same parts in the several figures.

Figure 1 represents a perspective view of my holdback applied to a thill and in actual use. Fig. 2 represents a longitudinal section of Fig. 1, together with a view in red ink, showing the breeching-strap iron in the act of being withdrawn from the holdback-plate by the forward movement of the horse in the direction of the arrow. Fig. 3 represents that part of my holdback which I denominate the "breeching-strap iron." Fig. 4 represents the old and well-known mode of applying a shaft-tug to a thill and its use as a holdback.

$a$ is a flat metal plate secured on top of the thill A about two and a half feet from its forward end by screws $k$ or in any suitable manner. A hollow oval-formed stop-piece $b$ rises from the rear portion of said plate, and so projects forward and upward as to overlap a part of the front portion of the plate, and in such manner as also to form an opening between the front portion of plate $a$ and the overlapping portion of stop $b$ and through the plate $a$ sufficient to permit the ready insertion and unobstructed withdrawal of the breeching-strap iron. (Represented in Fig. 3.) This plate $a$, with its stop $b$, may be cast entire of iron or any other suitable metal.

The breeching-strap iron I construct in the form represented in Fig. 3, it being made in a single piece of cast or wrought iron, with a longitudinal opening or connecting-eye $c$, by means of which it may be attached directly to the breeching of the harness or to a strap $g$, attached to said breeching. A shoulder $d$ extends forward from the eye $c$ and terminates in a circular-formed opening or loop $e$, which loop engages on the stop $b$ of plate $a$, as seen in Figs. 1 and 2, when the holdback is in use. The eye $c$ and the loop $e$, as formed, occupy a position at right angles in relation to each other, as clearly shown in section in Fig. 2, and from the forward portion of said loop an elbow-detent $f$ projects down and forward, as seen clearly in Figs. 2 and 3 and in dotted lines in Fig. 1. This detent $f$ in the action of the holdback when in use presses upon the under surface of the forward portion of the plate $a$ and assists in keeping or locking the loop e in proper position in contact with and over the stop b, which will be readily understood by reference to Figs. 1 and 2.

When the horse is backed into the thills, the breeching-strap iron is made by the operator to assume the position shown in red in Fig. 2, and thus may be readily adjusted into the position shown in black in said figure. It will be evident that when thus adjusted and the traces of the harness properly hitched the holdback will efficiently operate not only to sustain the thills in a horizontal position, but prevent the carriage from pressing forward upon the horse.

In Fig. 2 the thill A is shown broken away beneath the holdback for the purpose of exposing a "gain" or "slot" j, cut in the thill in order to permit the detent f to turn therein.

Supposing the holdback to have been in use and the horse about to be detached from the carriage, the operator unhitches the traces and upon the forward movement of the horse in the direction of the arrow the breeching-strap iron is turned over from the position as shown in black in Fig. 2 into the position as shown in red in the same figure, and thus becomes, as it were, automatically disengaged from the plate a and stop b.

In Fig. 4 I have illustrated the application of the shaft-tug h for sustaining the thills in a horizontal position and for holding back the carriage by means of said tug and iron i. I have also in the same figure shown the shaft-tug in red in the act of being drawn off the thill in such manner by the movement of the horse as to cause the tug to twist and bind upon the thill—a difficulty often experienced. In lieu of the slot j in the thill, a portion of plate a may be so elevated as to allow of the turning of the detent f. In case the action of the horse in traveling should cause the breeching-strap iron to rattle on the plate a, a strip of india-rubber, if deemed expedient, may be inserted between the plate a and the thill, thus confining the detent f in contact with the under forward part of plate a when the holdback is in use, but in nowise interfering with the insertion or withdrawal of the said breeching-strap iron.

Having thus described my invention and its mode of operation, what I claim as new therein, and desire to secure by Letters Patent of the United States, is—

A holdback composed of two parts, one part attached to the thill, the other attached to the harness, constructed and operating substantially in the manner and for the purpose set forth.

JOHN DAVIS.

Witnesses:
  E. OLIVER,
  MICHEL WHELTON.